(12) United States Patent
Dhanuka et al.

(10) Patent No.: US 10,366,518 B2
(45) Date of Patent: Jul. 30, 2019

(54) EXTENSION OF TEXT ON A PATH

(71) Applicant: Adobe Inc., San Jose, CA (US)

(72) Inventors: Praveen Kumar Dhanuka, Noida (IN); Ankur Murarka, Noida (IN)

(73) Assignee: Adobe Inc., San Jose, CA (US)

( * ) Notice: Subject to any disclaimer, the term of this patent is extended or adjusted under 35 U.S.C. 154(b) by 154 days.

(21) Appl. No.: 15/147,693

(22) Filed: May 5, 2016

(65) Prior Publication Data

US 2017/0322910 A1 Nov. 9, 2017

(51) Int. Cl.
*G06T 11/60* (2006.01)

(52) U.S. Cl.
CPC .......... *G06T 11/60* (2013.01); *G06T 2200/24* (2013.01)

(58) Field of Classification Search
CPC ................. G06F 17/212; G06T 11/60
See application file for complete search history.

(56) References Cited

U.S. PATENT DOCUMENTS

| 7,302,438 B1 * | 11/2007 | Gauthier | G06F 17/211 |
| 2006/0117255 A1 * | 6/2006 | Seeler | G06F 17/212 |
| | | | 715/246 |
| 2013/0304604 A1 * | 11/2013 | Hoffman | G06Q 30/0621 |
| | | | 705/26.5 |

OTHER PUBLICATIONS

Humblepotato, Text in a concentric circle, Feb. 9, 2010, Adobe Community, Adobe Systems Incorporated.*
Sharon Steuer, The Adobe Illustrator WOW! Book for CS6 and CC, Jul. 23, 2014, Peachpit Press, pp. 1-22 (Year: 2014).*
Brian Wood, Adobe Illustrator CC Classroom in a Book® (2014 release), Oct. 2014, Adobe Press, ISBN: 9780133905786, 128 pages (Year: 2014).*

* cited by examiner

*Primary Examiner* — Scott T Baderman
*Assistant Examiner* — Seung Woon Jung
(74) *Attorney, Agent, or Firm* — SBMC

(57) ABSTRACT

Techniques and systems are described to extend text on a path. The path, for instance, may be user specified and configured to control placement of subsequent text in a user interface. During entry of the text, the computing device detects that the text inputs overflow the input path. In response, the computing device generates a path that is linked to the input path to include the text that is to overflow the input path, e.g., through the use of threading. The generated path is then plotted in the user interface for inclusion of the overflow of text in the user interface, such as to mimic a shape of the input path after translation or scaling at the translated location.

20 Claims, 10 Drawing Sheets

EXTENSION OF TEXT ON A PATH

BACKGROUND

Text is one of the most important considerations in the design of digital content. Arrangement of text, for instance, is typically used to communicate an underlying purpose of digital content, such as a name in a poster, a destination in a travel pamphlet, codes within an infographic, tagline in an advertisement, websites, books, advertisements, and so forth. Accordingly, this has relevance to digital content as well as subsequent uses of the digital content, such as printed publications.

One way to beautify the design of the text is to display the text along a path, which may be user defined. The user, for instance, may draw a linear or nonlinear path in a user interface on which text is to appear. This can be the circumference of a circle, the edges of a rectangle, a sinusoidal path, or any other path as desired. After the path is set, the user then begins writing text onto this path, and thus this process is typically referred to as "Type on Path."

Oftentimes, however, the path input by the user does not have sufficient length to contain all of the subsequent text input by the user. Conventionally, this causes output of an indication (e.g., a red icon indicating an "overset" condition) that text has been input but there is insufficient room for rendering of the text on the path. In such a situation, a user in conventional techniques is then forced to switch modes to specify another path and then switch modes again to enter text onto the path. If the user again did not provide a path having sufficient room for the text being entered, this process is repeated. Accordingly, these conventional techniques may be frustrating and inefficient.

For example, text rendering along a user-specified path is employed to beautify inclusion of text as part of digital content. Conventional techniques to do so, however, involve switching between modes to specify the path and then enter the text when confronted with an amount of text that is too long to be rendered on the path. For example, conventional techniques involve a path selection mode to specify the path and a typing mode to enter text on the path. Accordingly, modifications to the path after typing, such as when the path does not have sufficient length, involves switching between these modes. This switching is inefficient, frustrating, and may even result in a lack of accuracy due to manual reliance on a user to extend the path in a visually pleasing manner, e.g., when drawing an additional freeform path.

SUMMARY

Techniques and systems are described to extend text on a path. The path, for instance, may be user specified and configured to control placement of subsequent text in a user interface, e.g., as a freeform path. The path is freeform such that a shape of the path is free to deviate from a regular or formal structure or shape. During entry of the text, the computing device detects that the text inputs overflow the input path. In response, the computing device generates a path that is linked to the input path to include the text that is to overflow the input path, e.g., through the use of threading.

Generation of the path may be performed in a variety of ways. For example, bounds of the input path may be determined. A translation for the generated path is also determined from the input path, e.g., so that the generated path does not overwrite the input path. The generated path is then plotted in the user interface for inclusion of the overflow of text in the user interface, such as to mimic a shape of the input path at the translated location.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Techniques and systems are described to extend text on a path. In one example, a user inputs a path in a user interface. This may be performed by manually drawing a freeform path using a stylus, use of a cursor control device, and so forth. Once drawn, a user then provides text inputs that are arranged by a computing device on the input path.

While providing the text inputs, the computing device detects that the text inputs overflow the input path. In response, the computing device generates a path that is linked to the input path to include the text that is to overflow the input path. By linking, continuation of inclusion of the text inputs on the generated path may continue in real time as these inputs are received, i.e., the text is threaded. In one embodiment, the generated path may be separated from the input path in the user interface. In another embodiment, the generated path is connected to the input path.

Generation of the path may be performed in a variety of ways. For example, bounds of the input path may be determined. The computing device then computes a transformation so that the generated path does not overwrite the input path. Transformations include scaling and translation of the generated path in relation to the input path. Translations include vertical, horizontal, diagonal, and over movements in the user interface. The generated path is then plotted in the user interface for inclusion of the overflow text in the user interface, such as to mimic a shape of the input path subject to the transformation. In this way, a user may specify a single input path and have extensions to that input path automatically generated by the computing device without user intervention in real time as text inputs are received. A variety of other examples are also contemplated, further discussion of which is included in the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
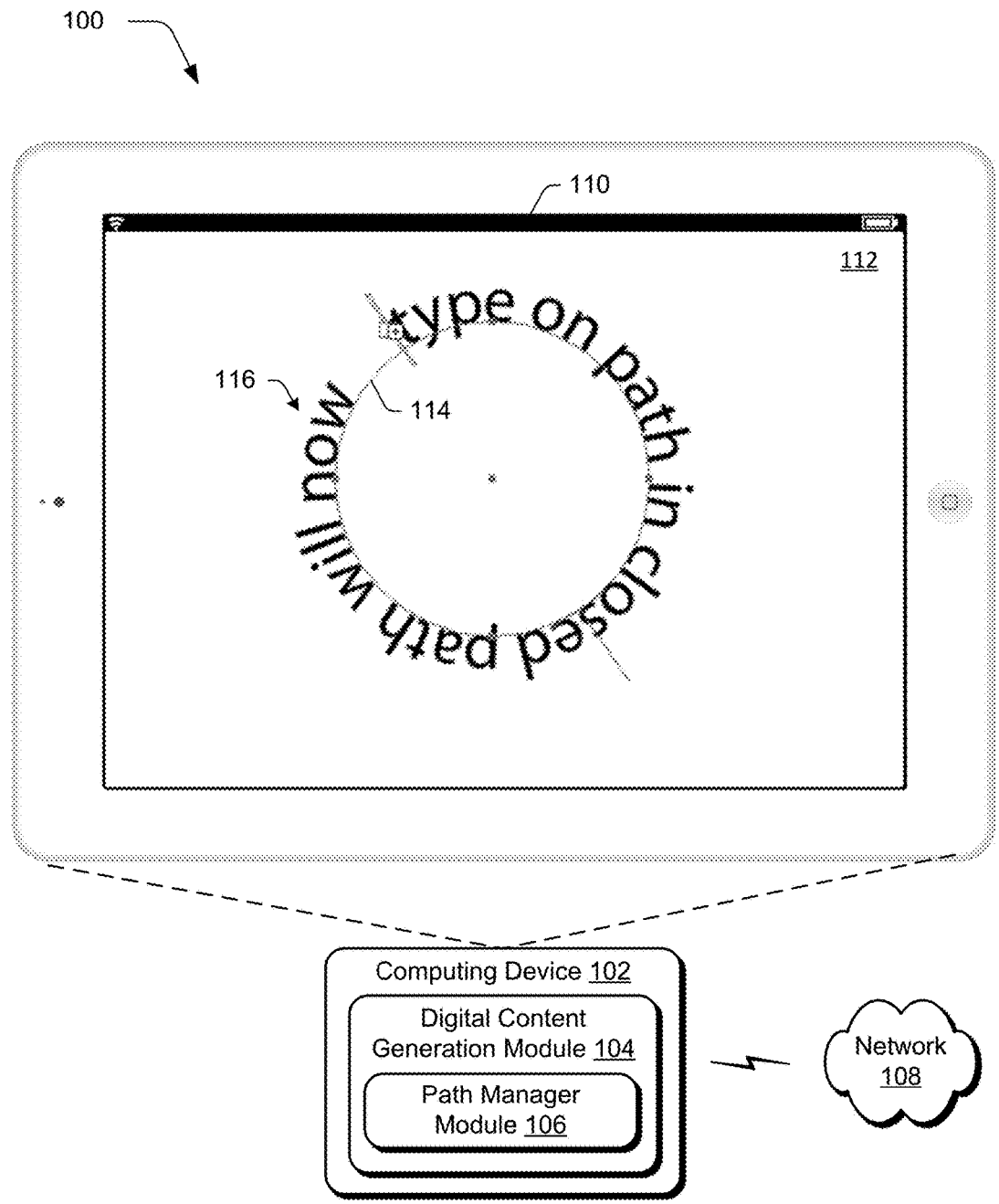
FIG. 1 is an illustration of an environment in an example embodiment that is operable to employ path extension techniques described herein.

FIG. 1 is an illustration of an environment 100 in an example embodiment that is operable to employ techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 10.

The computing device 102 is illustrated as including a digital content generation module 104. The digital content generation module 104 is implemented at least partially in hardware (e.g., as part of the computing device 102) to generate digital content. This includes creation of digital content, modification of existing digital content, and so forth. Digital content may take a variety of different forms, examples of which include images having text. Digital content, for instance, may be configured for rendering by a display device, electronic storage, as a basis to form corresponding images on a tangible substrate (e.g., paper or other printed substrates), and so forth.

The digital content generation module 104 includes a path manager module 106. The path manager module 106 is implemented at least partially in hardware to manage inclusion of text on an input path. Although the digital content generation module 104 and path manager module 106 are illustrated as implemented locally on the computing device 102, this functionality may be further divided over a network 108, e.g., "in the cloud," as further described in relation to FIG. 10.

As illustrated on a display device 110 of the computing device 102, a user interface 112 is rendered for display to a user. The user interface 112 includes a path 114 that defines "where" text 116 is to be displayed in the user interface 112. A user, for instance, may input the path 114 using touchscreen functionality of the display device 112, select from a preconfigured path in a library, draw a freeform path using a cursor control device, and so forth. A user then enters text 116 (e.g., using a keyboard, speech recognition, gestures, etc.) which is then arranged on the path 114 by the path manger module 106. As previously described, instances may be encountered in which an amount of space available on the path 114 is not sufficient to display the text entered by the user. Accordingly, the path manager module 106 is configured to generate an extension to the path 114, referred to as the generated path in the following, having space to continue threading of this text. Further discussion of path generation and control of text entry is described in relation to the following system.

Figure 2:
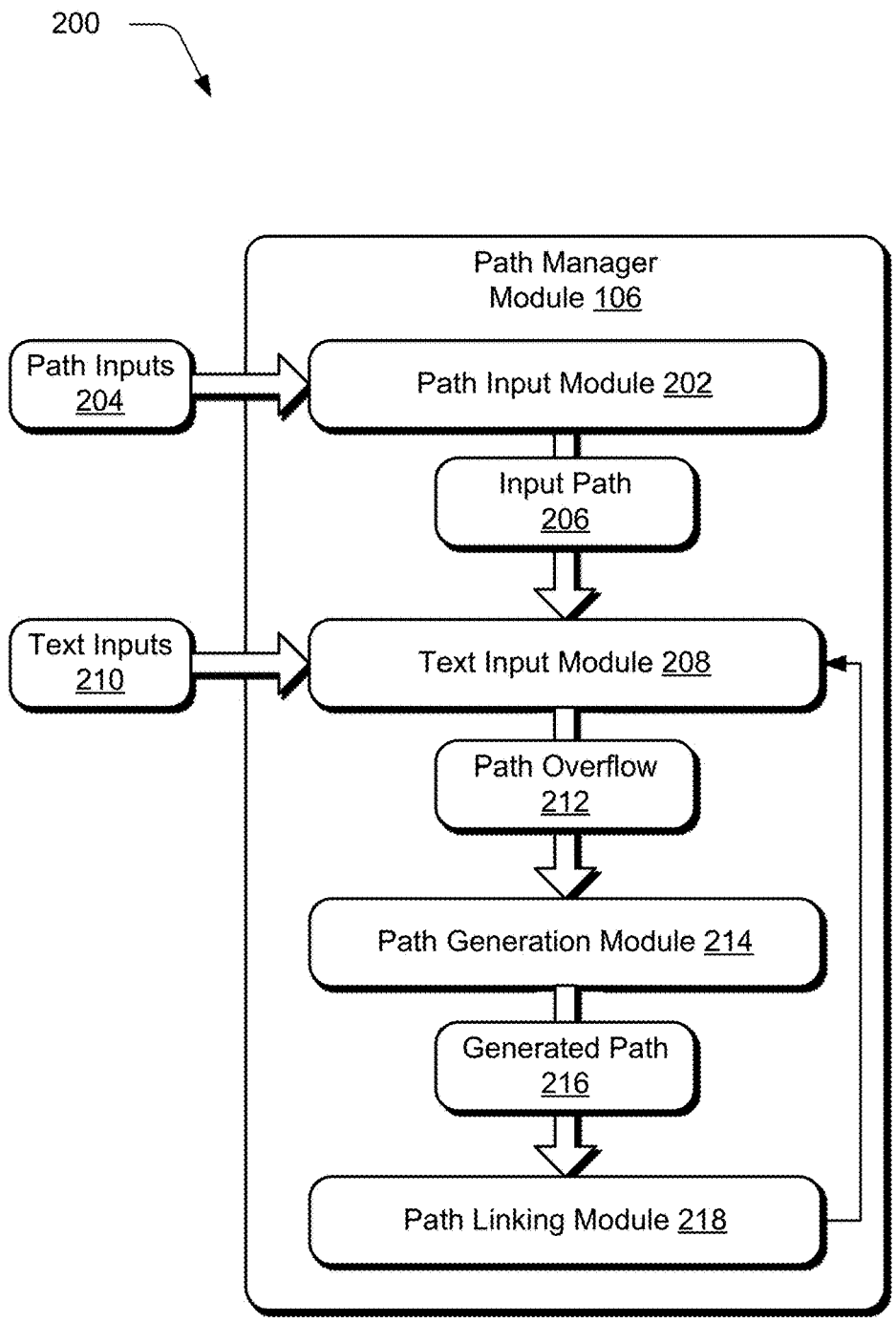
FIG. 2 depicts a system showing operation of a path manager module of FIG. 1 in greater detail.

FIG. 2 depicts a system 200 showing operation of the path manager module 106 of FIG. 1 in greater detail. The path manager module 106 includes a path input module 202 that is implemented at least partially in hardware to accept path inputs 204 to form an input path 206. The path inputs 204, as previously described, may be input in a variety of ways. Examples of such path inputs include a manually drawn path (e.g., by a user's finger or stylus) that is detected using touchscreen functionality, a manually drawn path input using a cursor control device (e.g., mouse or trackpad), use of a natural user interface (e.g., detected "in the air" using a camera), selection from a predefined library of paths, and so forth.

The input path 206 is then provided to a text input module 208. The text input module 208 is implemented at least partially in hardware to control inclusion of text received via text inputs 210 on the input path 206. A user, for instance, may provide text inputs 210 via a keyboard, spoken utterance, and so forth. In response, the text input module 208 arranges text provided by the text inputs 210 along the input path 206. As shown in FIG. 1, for instance, the text 116 "type on path in closed path will now" from text inputs 210 is disposed on a closed circular path 114 (e.g., input path 206) formed based on path input 204, e.g., are user specified.

As part of this, the user continues to provide text inputs 210, such as to specify "extend automatically." The text input module 208, as part of control of the text on the input path 206, then detects that this text overflows the input path 206. In other words, there is no longer room on the input path 206 to render this portion of the text without changing a size of the text (e.g., font size) in the user interface 112. This is referred to as detection of a path overflow 212 in the following.

In response, an indication of the path overflow 212 is communicated to a path generation module 214. The path generation module 214 is implemented at least partially in hardware to form a generated path 216. The generated path 216 is formed automatically and without user intervention in a non-modal manner, e.g., without switching between path entry and text entry modes as required in conventional techniques. Accordingly, the generated path 216 may be generated in real time for inclusion of this additional text that overflows the input path 206. The generated path 216 is then linked to the input path 206 such that text specified by the additional text inputs 210 is included on the generated path 216. Thus, the linking of the generated path 216 to the input path 206 is performed to continue control of text inputs 210 from the input path 206 to the generated path 216, i.e., the text continues to thread. Accordingly, the input and generated paths 206, 216 do not have to "touch" in the user interface 112.

In this way, a user may continue to provide text inputs 210 that are disposed on the generated path 216 in real time without requiring modal navigation back to manually specify an extension to the input path 206 as is required by conventional text-on-path techniques. Creation of the generated path 216 by the path generation module 214 may be performed in a variety of ways, an example of which is further described in the following.

Figure 3:
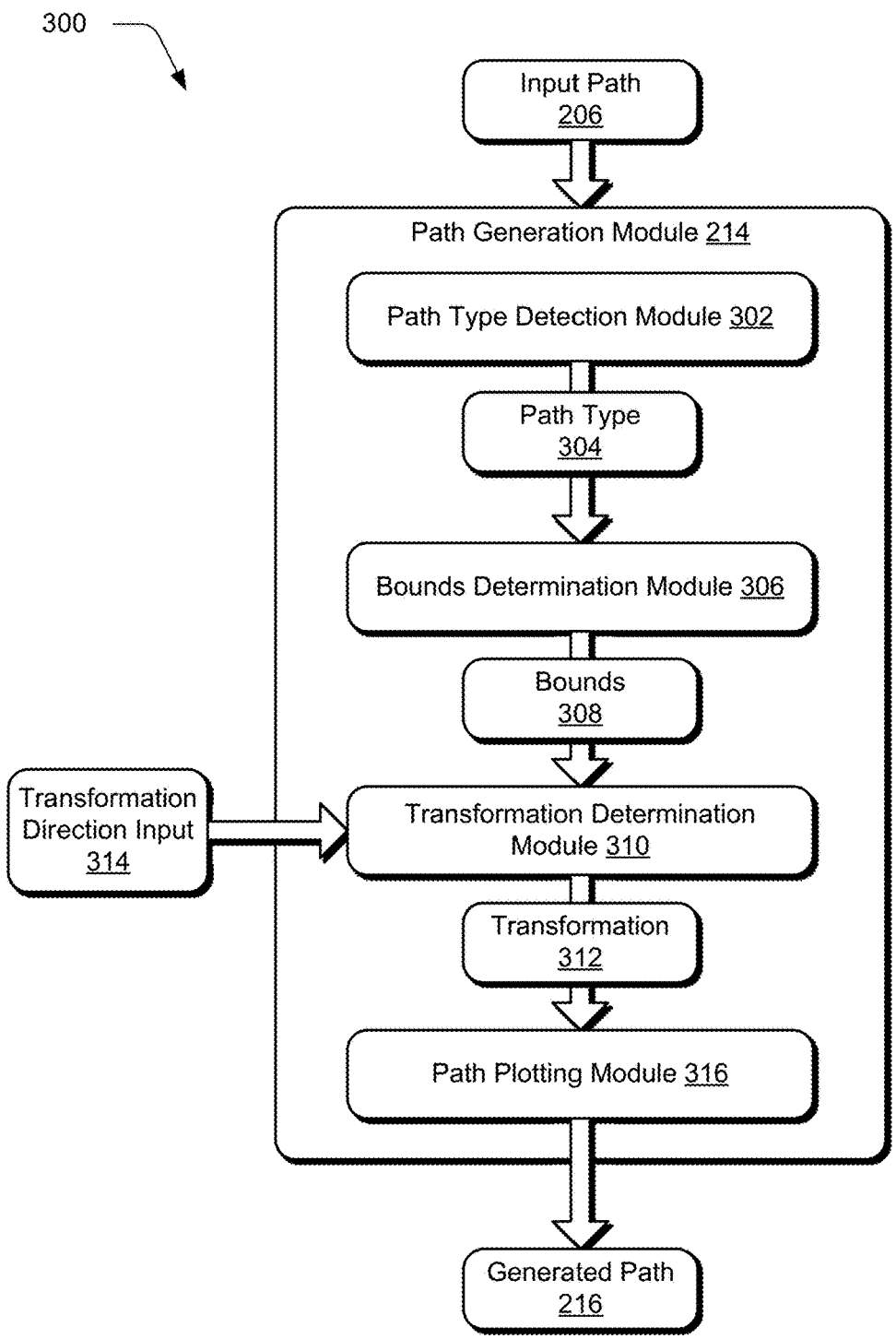
FIG. 3 depicts a system in an example embodiment showing operation of a path generation module of FIG. 2 in greater detail.

FIG. 3 depicts a system 300 in an example embodiment showing operation of the path generation module 214 of FIG. 2 in greater detail. Generally, to form the generated path 216, the path generation module 214 is executed responsive to detection that the text inputs 210 have or are about to reach a path overflow 212, e.g., within a defined threshold of a path overflow condition. To begin, the path manger module 106 first sets the input path 206 as "P." A generated path 216 is formed as a transformed copy from the input path 206 "P". The generated path 216 is then linked with the input path 206 to form a new path, i.e., to continue threading of text on the path. The new path is then treated as the input path 206 should additional extensions be warranted.

Figure 5:
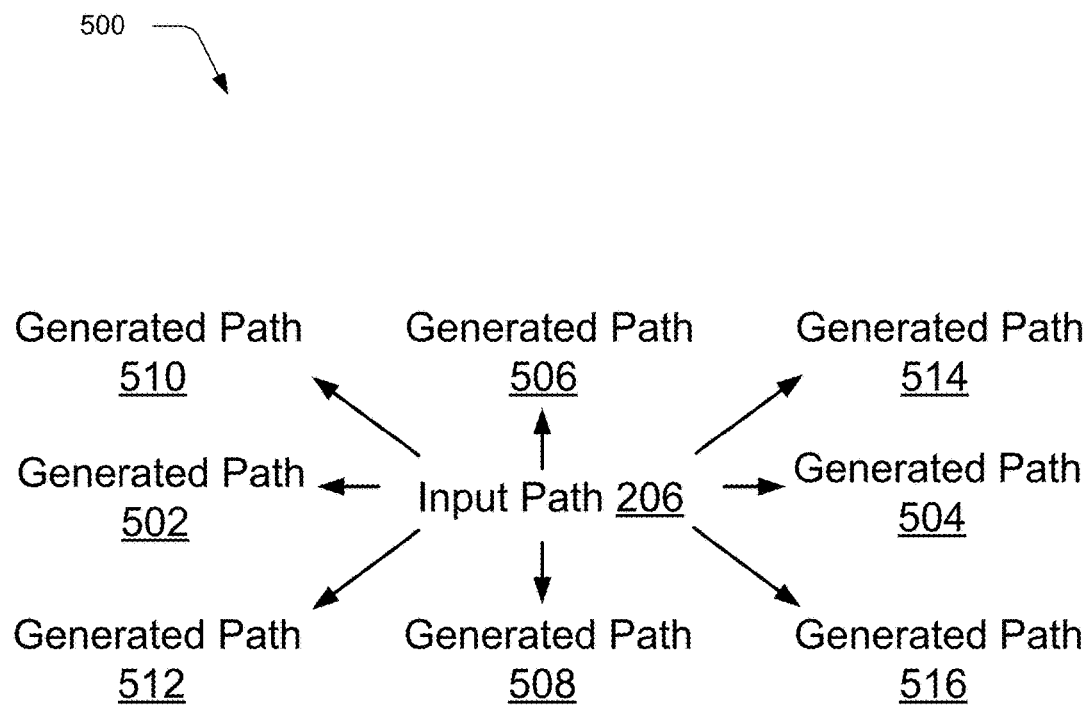
FIG. 5 depicts an example embodiment showing translation direction options.
Figure 6:
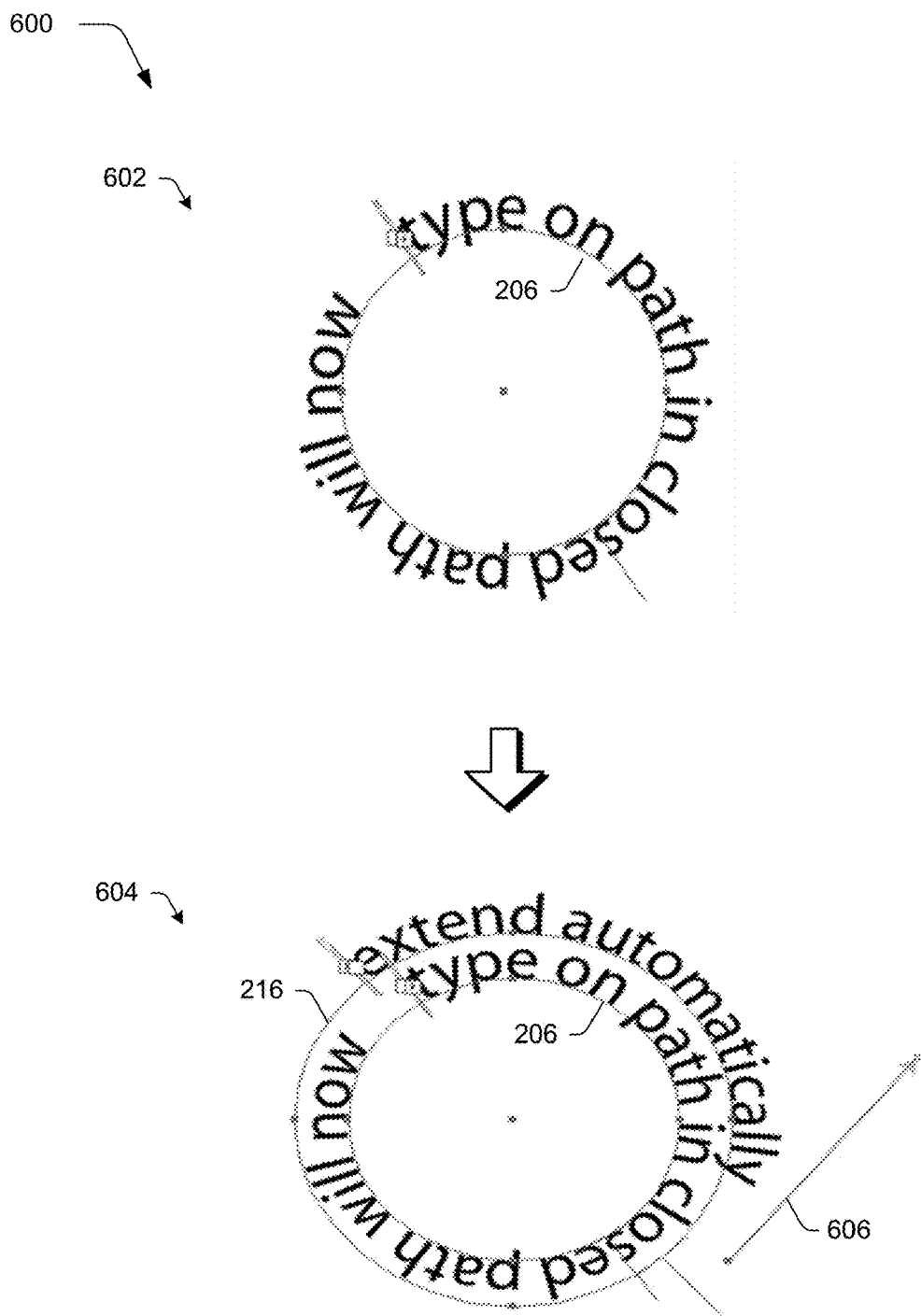
FIG. 6 depicts an example user interface showing path generation for a closed path type through use of scaling.

The generated path 216 is transformed to protect against overwriting the input path 206 by the generated path. In the illustrated example, the path generation module 214 first employs a path type detection module 320 to determine a path type 304 of the input path 206. Examples of path types 304 include an "open" path type having unconnected ends as shown in FIG. 5 and a "closed" path type having connected ends as shown in FIG. 6. Path types may be used as a basis to control a configuration of the generated path 216 as described in greater detail below. Each of these different paths is addressed separately in the following.

Figure 4:
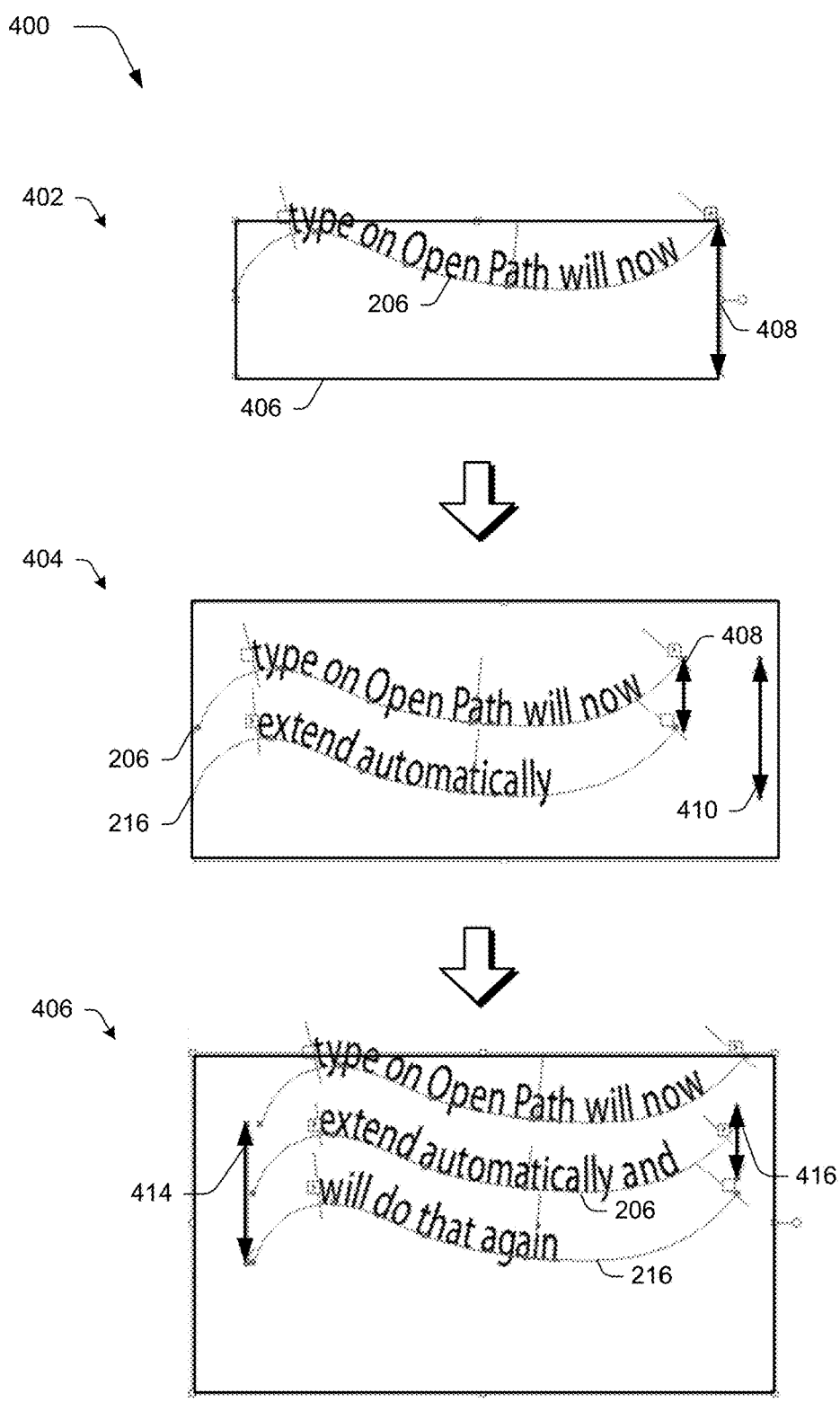
FIG. 4 depicts an example user interface showing path generation for an open path type.

For an open path type, a bounds determination module 306 is implemented at least partially in hardware to determine bounds 308 of the input path 206, e.g., vertical and horizontal boundaries of a bounding box, a circular boundary, and so forth. FIG. 4 depicts an example user interface 400 through use of first, second, and third stages 402, 404, 406. At the first stage 402, the bounds determination module 306 determines the bounds 308 (e.g., visual bounds) of the input path 206 as a bounding box 406 in both vertical and horizontal directions in the user interface 400.

From the bounds 308 (e.g., bounding box 406), the transformation determination module 310 determines a transformation 312 to be employed for placement of the generated path 216. For example, the transformation determination module 312 may first determine which axis of the bounding box 406 is longer, which in this example is the horizontal axis of the bounding box 406. From this, the transformation determination module 310 determines a direction of transformation 312 that is generally perpendicular to the longer axis of the bounding box. In illustrated example, the vertical axis is perpendicular to the longer axis. Other examples are also contemplated, such as based on a transformation direction input 314, e.g., a stored preference indicating a direction, which may also be rule based.

FIG. 5, for instance, depicts an example user interface 500 showing directions usable for part of a transformation of an input path 206 to form a generated path. One example includes horizontal directions in which the generated path 502 is disposed before the input path 206 or the generated path 504 is disposed behind the input path. Another example includes vertical directions such that generated path 506 is disposed above the input path 206 or the generated path 508 is disposed below the input path 206. Diagonal directions are also contemplated in which the generated paths 510, 512, 514, 516 are disposed in relation to corners of a bounding box of the input path 206. A variety of other examples are also contemplated.

Returning again to FIG. 3, The transformation determination module 310 also determines an amount of the transformation 312 in the user interface based on the bounds. As shown at the first stage 402 of FIG. 4, for instance, transformation 312 is based on a vertical axis component 408 of the bounding box 406. Based on the direction and size of this transformation 312, a path plotting module 316 is implemented at least partially in hardware to plot the generated path 216 for use in controlling placement of text specified by the text inputs 210.

As illustrated at the second stage 404, the vertical component 408 of the bounding box 406 is used to translate a copy of the input path 206 in a vertical direction 408 to form the generated path 216. The generated path 216 is then linked to the input path 206 by the path linking module 218 to thread text between the paths. After which, the text input module 208 is used to control inclusion of text on the generated path 216. Thus, in this case a shape of the generated path 216 mimics a shape of the input path 206 at a translated location within the user interface.

This process may continue, an example of which is illustrated at the third stage 406. For example, transformation 414 is also based for a copy of the input path 206 in a vertical direction 416 to form the generated path 216 based on bounds of the input path 206. Through linking (i.e., threading) entry of text may continue on this newly generated path 216 at the third stage 406 in a non-modal manner Similar techniques may also be employed for closed path types, examples of which are described in the following.

Return will now be made again to FIG. 3, in this example the path type detection module 302 detects a closed path type 304 of an input path 206. A closed path type 304 is used to describe an instance in which the input path 206 has connected ends. Options for transformation of the generated path 216 include scaling and/or translation.

In a scaling example, the user interface 600 of FIG. 6, depicts generation of a path having a closed path type through use of first and second stages 602, 604. At the first stage 602, the path type detection module 302 detects a path type 304 of "closed" in response to detection of a path overflow 212 by the text input module 208.

As before, the bounds determination module 306 detects a bounds 308 of the input path 206. The transformation determination module 310 then determines a transformation 312 involving scaling of the input path 206. As shown at the second stage 604 of FIG. 6, for instance, the transformation 312 involves scaling in an outward direction 606 from the input path 206 to form the generated path 216. Scaling in this example is set in relation to a font size of text of the input path 206, e.g., 120%. Other examples are also contemplated, such as through use of a value manually set by a user. As before, linking is then used to support text threading from the input path 206 to the generated path 216. Scaling may also be performed internal to the input path 206. Thus, in this example scaling and translation are both used to form the generated path 216. Translation may also be used, alone, to form the generated path, an example of which is described in the following.

Figure 7:
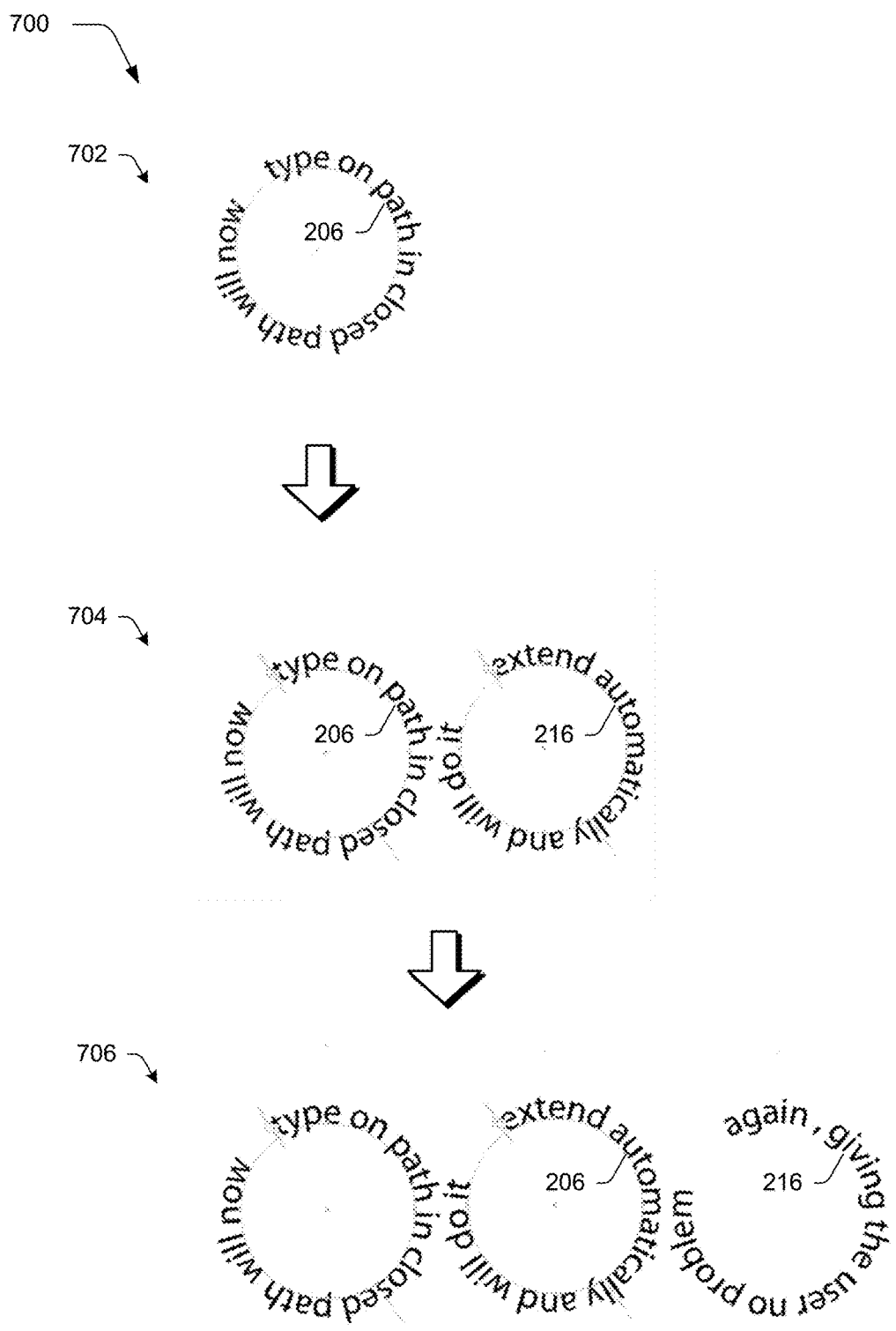
FIG. 7 depicts another example user interface showing path generation for a closed path type through use of translation.

FIG. 7 depicts an example user interface 700 as generating paths using translation for a closed path type. This example is illustrated using first, second, and third stages

702, 704, 706. At the first stage 702, an input path 206 is received that includes text as previously described. As text is input in real time, a path overflow is detected. In response, a generated path 216 is formed based on a transformation by a width of the bounds of the input path 206 as shown at the second stage 704.

As before, linking is performed to continue threading text from the input path 206 to the generated path 216. For example, this linking may be used to navigate back and forth between the input path 206 and the generated 216, e.g., to backspace to remove text, modify text, and so forth between the paths. This process may continue to form an additional generated path 216 by treating the previously generated path 216 in the second stage 704 as the input path 206 in the third stage 706.

Thus, although the generated path is used to enter text if the user "keeps typing" any of the paths may be used to enter text, e.g., to navigate to different portions of the path. For example, a user may have made a mistake while typing, thus move to the "input" path to correct this mistake. Since the input path and the generated path are already linked, the text may then continue automatically to this generated path without generating yet another path.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-7.

Figure 8:
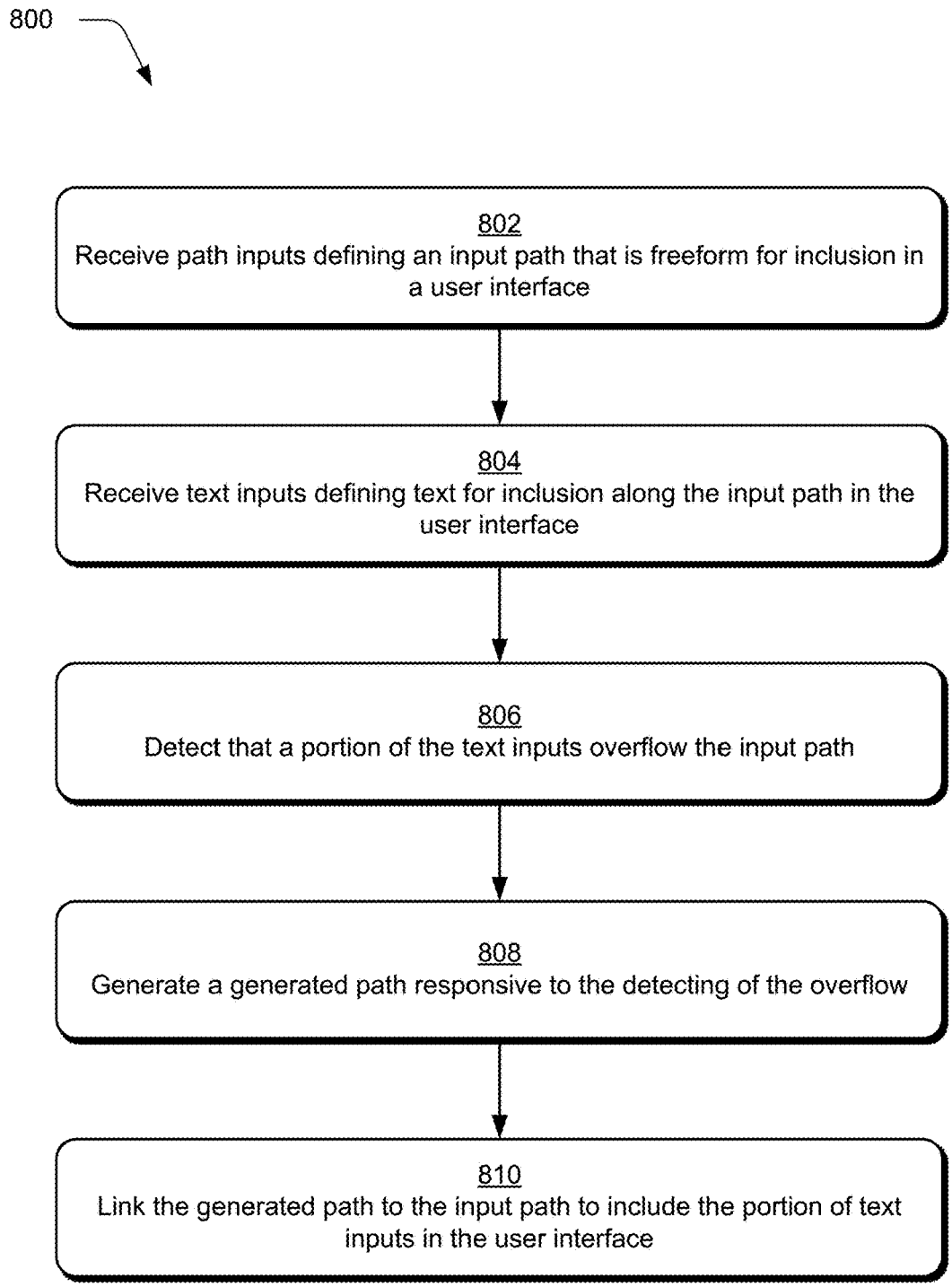
FIG. 8 is a flow diagram depicting a procedure in an example embodiment in which text is automatically extended along a path generated in a user interface.

FIG. 8 depicts a procedure 800 in an example embodiment in which text is automatically extended along a path generated in a user interface. Path inputs are received that define an input path that is freeform for inclusion in a user interface (block 802). The path inputs 204, for instance, may be input using touchscreen functionality of a display device 110, through use of a cursor control device, selected from a preconfigured library of path shapes, and so forth.

Text inputs are also received that define text for inclusion along the input path in the user interface (block 804). Continuing with the previous example, the user may then begin provision of text inputs 210 through use of a keyboard, speech-to-text functionality, or any other technique usable to enter text to a computing device 102.

A portion of the text inputs is detected that overflow the input path (block 806). The text input module 208 may detect that the text specified by the text inputs 210 overflow the input path 206 are within a pre-defined threshold of an "end" of the input path 206, and so forth.

A generated path is generated responsive to the detecting of the overflow (block 808). Generation of the path may be performed in a variety of ways, such as based on a shape, bounds 308, employ a transformation 312 based on the input path 206, and so forth. The generated path is linked to the input path to include the portion of text inputs in the user interface (block 810), e.g., through the use of text threading. In this way, a user may continue to enter text and have the input path 206 automatically extended in a non-modal manner.

Figure 9:
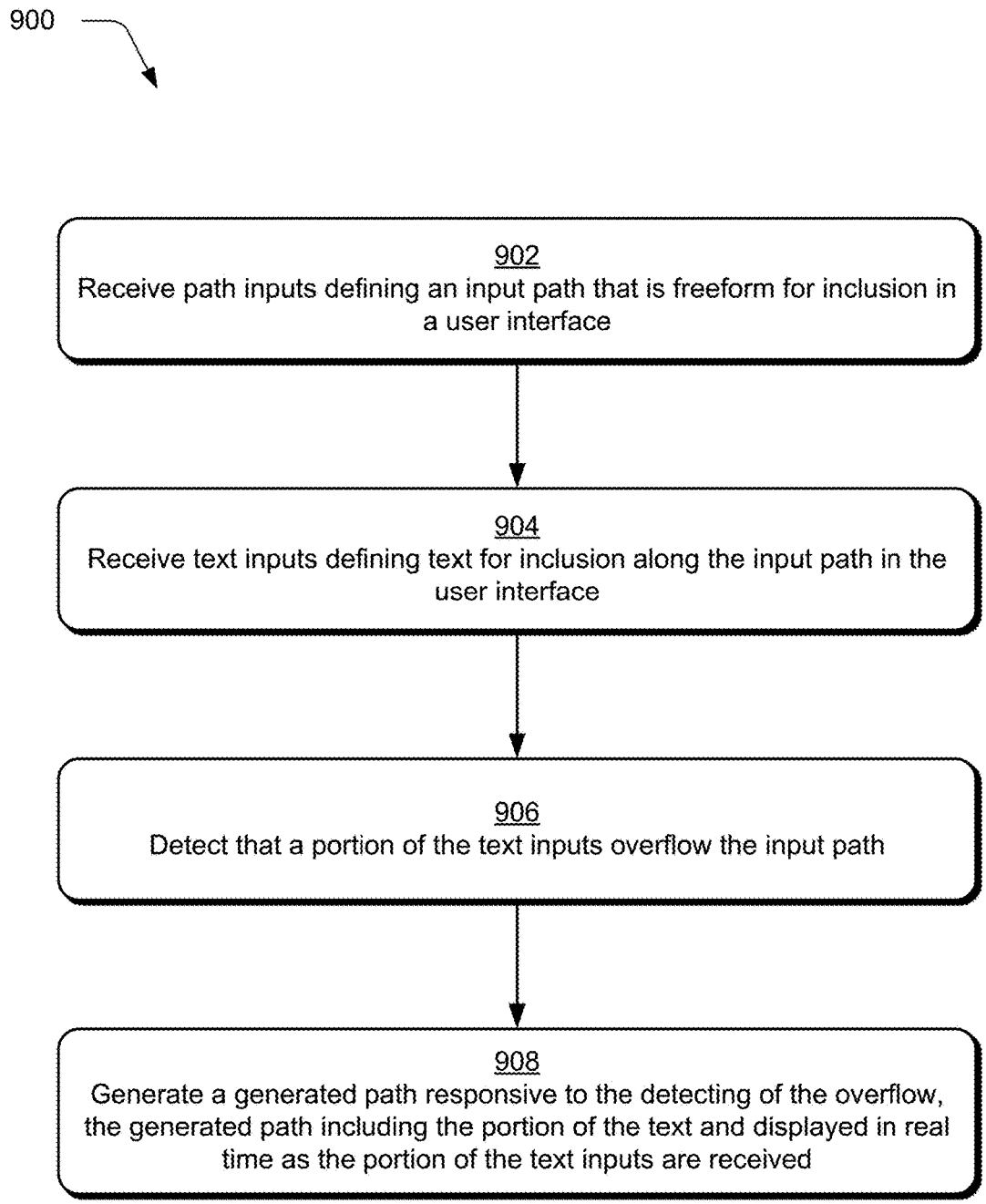
FIG. 9 is a flow diagram depicting a procedure in an example embodiment in which text is extended along a path generated in a user interface in real time.

FIG. 9 depicts a procedure 900 in an example embodiment in which text is extended along a path generated in a user interface in real time. As before, path inputs are received that define an input path that is freeform for inclusion in a user interface (block 902). Text inputs are also received that define text for inclusion along the input path in the user interface (block 904). A portion of the text inputs is then detected that overflow the input path (block 906).

A generated path is then generated in response to the detecting of the overflow. The generated path includes the portion of the text and is displayed in real time as the portion of the text inputs are received (block 908). For example, generation of the generated path 216 and subsequent linking of the generated path 216 to the input path 206 may be used to continue threading of text on the generated path 216. This may be performed "as the user is typing" to support efficient path extension in an intuitive manner. Other examples are also contemplated as previously described.

Example System and Device

Figure 10:
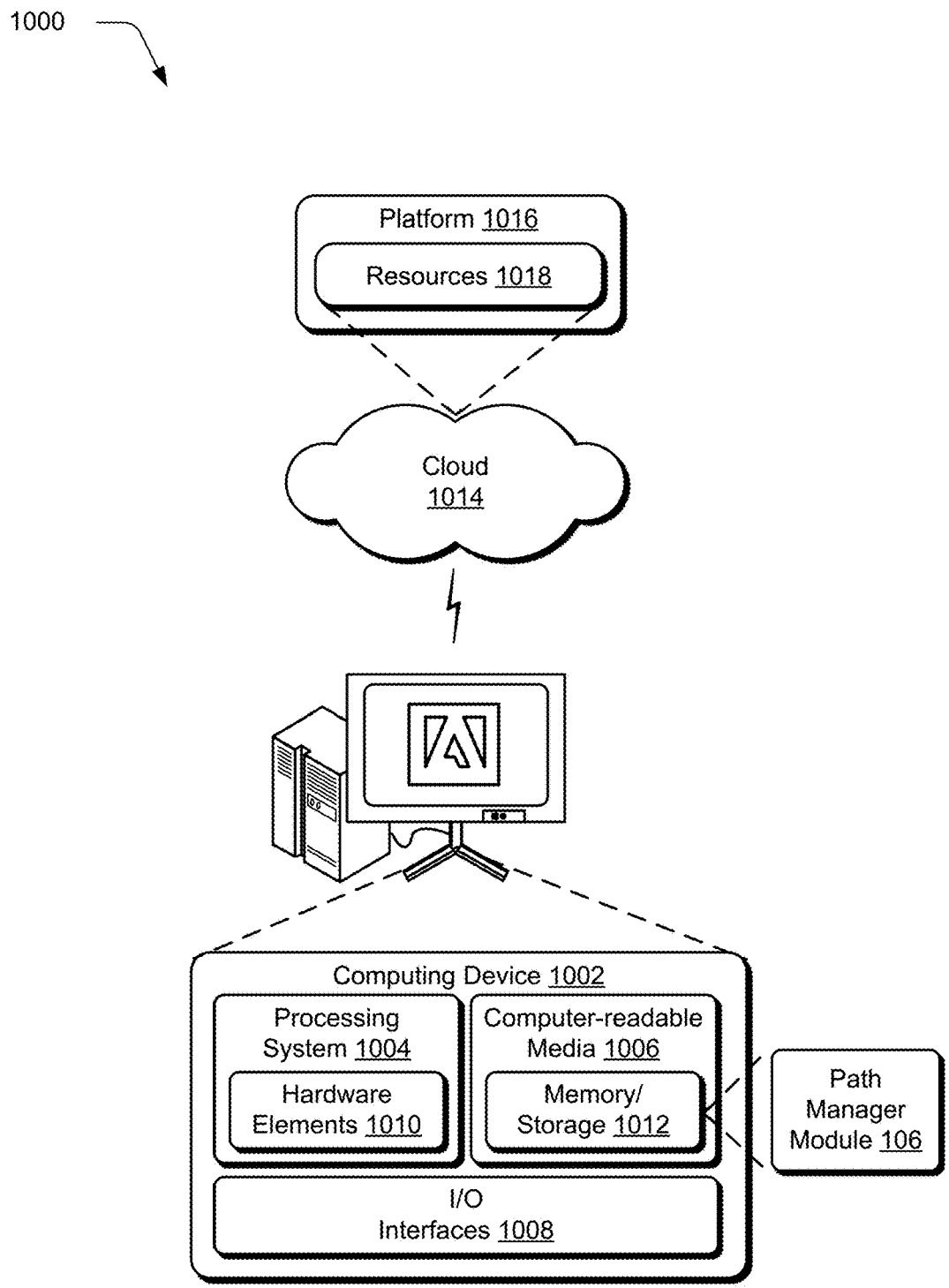
FIG. 10 illustrates an example system including various components of an example device that can be implemented as any type of computing device as described and/or utilize with reference to FIGS. 1-9 to implement embodiments of the techniques described herein.

FIG. 10 illustrates an example system generally at 1000 that includes an example computing device 1002 that is representative of one or more computing systems and/or devices that may implement the various techniques described herein. This is illustrated through inclusion of the path manager module 106. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   receiving, by the at least one computing device, an input corresponding to a freeform input path for inclusion in a user interface;
   receiving, by the at least one computing device, text input corresponding to text for inclusion along the freeform input path in the user interface;
   detecting, by the at least one computing device, an instance in which a portion of the text input overflows the input path;
   determining, by the at least one computing device, a boundary of the freeform input path;
   determining, by the at least one computing device, a transformation to be applied between the freeform input path and a new path based on a direction from the freeform input path to a translated location;
   automatically generating in response to the instance of the detecting, by the at least one computing device, the new path for inclusion of the text defined by the portion of the text input, the new path generated based on the freeform input path, the boundary of the freeform input path, and the direction from the freeform input path to mimic a shape of the freeform input path at the translated location within the user interface; and
   linking, by the at least one computing device, the new path to the freeform input path to cause the text defined by the portion of the text input that overflows the freeform input path to be included on the new path at the translated location within the user interface.

2. The method as described in claim 1, wherein the generating includes plotting, by the at least one computing device, the new path based on the boundary and the transformation.

3. The method as described in claim 1, wherein the transformation involves the direction from the freeform input path to the translated location, the direction comprising one of a vertical, horizontal, or diagonal direction from the freeform input path to the translated location in the user interface.

4. The method as described in claim 1, wherein the boundary of the freeform input path includes at least two dimensions, and wherein the direction from the freeform input path to the translated location of the transformation is generally perpendicular to a longer of the at least two dimensions.

5. The method as described in claim 1, wherein the freeform input path is freeform such that a shape of the freeform input path is free to deviate from a regular or formal structure or shape.

6. The method as described in claim 1, wherein the translated location is determined based on the freeform input path so that the new path does not overwrite the freeform input path.

7. The method as described in claim 1, wherein the direction from the freeform input path to the translated location within the user interface is determined based on dimensions of the boundary of the freeform input path.

8. The method as described in claim 1, wherein the direction from the freeform input path to the translated location within the user interface is obtained as user input.

9. The method as described in claim 1, wherein the direction from the freeform input path to the translated location within the user interface is obtained as a stored preference.

10. The method as described in claim 1, wherein the new path is generated as the portion of the text input is received in real time.

11. A method comprising:
    receiving, by the at least one computing device, a user input corresponding to an input path that is freeform for inclusion in a user interface;
    receiving, by the at least one computing device, text input corresponding to text for inclusion along the input path and displayed in real time in the user interface;
    detecting, by the at least one computing device, an instance in which a portion of the text input overflows the input path;
    determining, by the at least one computing device, a boundary of the input path;
    determining, by the at least one computing device, a transformation to be applied between the input path and a new path based on a direction from the input path to a translated location;
    automatically generating in response to the instance of the detecting, by the at least one computing device, the new path that mimics a shape defined by the input path for inclusion of the portion of the text input at the translated location, the new path generated based on the input path, the boundary of the input path, and the direction from the input path, the new path displayed in real time at the translated location within the user interface, the displayed new path including the portion of the text input that overflows the input path.

12. The method as described in claim 11, wherein the generating includes plotting, by the at least one computing device, the new path based on the boundary and the transformation.

13. The method as described in claim 11, wherein the user input corresponding to the input path is received as a freeform drawing via an input device.

14. A system comprising:
    a path input module implemented at least partially in hardware to receive input corresponding to an input path that is freeform for inclusion in a user interface;
    a text input module implemented at least partially in hardware to receive text input corresponding to text for inclusion along the input path in the user interface and detect an instance in which a portion of the text input overflows the input path;
    a path generation module implemented at least partially in hardware to obtain a boundary of the input path and a direction from the input path to a translated location within the user interface, and automatically generate a new path at the translated location responsive to the instance of detecting the overflow, the new path including the overflow text defined by the portion of the text input and the new path generated based on the input path, the boundary of the input path, and the direction from the freeform input path; and
    a path plotting module implemented at least partially in hardware to plot the new path, at the translated location in the user interface, to mimic a shape of the input path for display of the overflow text as the new path is generated in real time.

15. The system as described in claim 14, wherein the path plotting module is configured to plot the generated path by plotting the new path based on the boundary and the transformation.

16. The system as described in claim 14, wherein the path plotting module is configured to display the text along the new path non-modally.

17. The system as described in claim 14, wherein the translated location is determined based on the input path so that the new path does not overwrite the input path.

18. The system as described in claim 14, wherein the direction from the input path to the translated location within the user interface is determined based on dimensions of the boundary of the input path.

19. The system as described in claim 14, wherein the direction from the input path to the translated location within the user interface is obtained as user input.

20. The system as described in claim 14, wherein the direction from the input path to the translated location within the user interface is obtained as a stored preference.

\* \* \* \* \*